United States Patent [19]
Boerema et al.

[11] Patent Number: 5,524,050
[45] Date of Patent: Jun. 4, 1996

[54] TELEPHONE MOUNTING SYSTEM FOR A VEHICLE

[75] Inventors: Edward T. Boerema, West Olive; Robert W. Grimes, III, Grand Haven; Daniel J. Hendon, Holland; Rick A. Anderson, Grand Haven; Gregory T. Ruggles, Holland, all of Mich.

[73] Assignee: Prince Corporation, Holland, Mich.

[21] Appl. No.: 69,181

[22] Filed: May 28, 1993

[51] Int. Cl.⁶ .................................................. H04M 1/00
[52] U.S. Cl. .................. 379/441; 379/446; 379/455; 379/454
[58] Field of Search ................. 379/441, 466, 379/449, 450, 455, 426, 454; 296/37.15, 37.8; 224/42.42, 275; 297/194

[56] References Cited

U.S. PATENT DOCUMENTS

| D. 291,026 | 7/1987 | Bird, Jr. . |  |
|---|---|---|---|
| 3,338,629 | 8/1967 | Drees | 224/275 |
| 4,640,542 | 2/1987 | Watier et al. . | |
| 4,706,273 | 11/1987 | Spear et al. . | |
| 4,868,862 | 9/1989 | Ryoichi et al. . | |
| 5,048,083 | 9/1991 | Dunchock . | |
| 5,071,049 | 12/1991 | Mozer . | |
| 5,111,360 | 5/1992 | Baba . | |

FOREIGN PATENT DOCUMENTS

| 2536854 | 3/1977 | Germany | 296/37.8 |

*Primary Examiner*—Thomas W. Brown
*Assistant Examiner*—Jack Chiang
*Attorney, Agent, or Firm*—Price Heneveld Cooper DeWitt & Litton

[57] ABSTRACT

A telephone mounting system includes a carriage which is mounted within the top or cover of a vehicle storage console or armrest and pivots from a stored position in which its decorative surface is substantially flush with the upper surface of the console or armrest to a use position in which the opposite side of the carriage is presented and holds a cellular telephone handset. Access for use of the telephone, therefore, is provided without opening the cover of the console or armrest and the cover can be moved independently of the telephone mount.

25 Claims, 5 Drawing Sheets

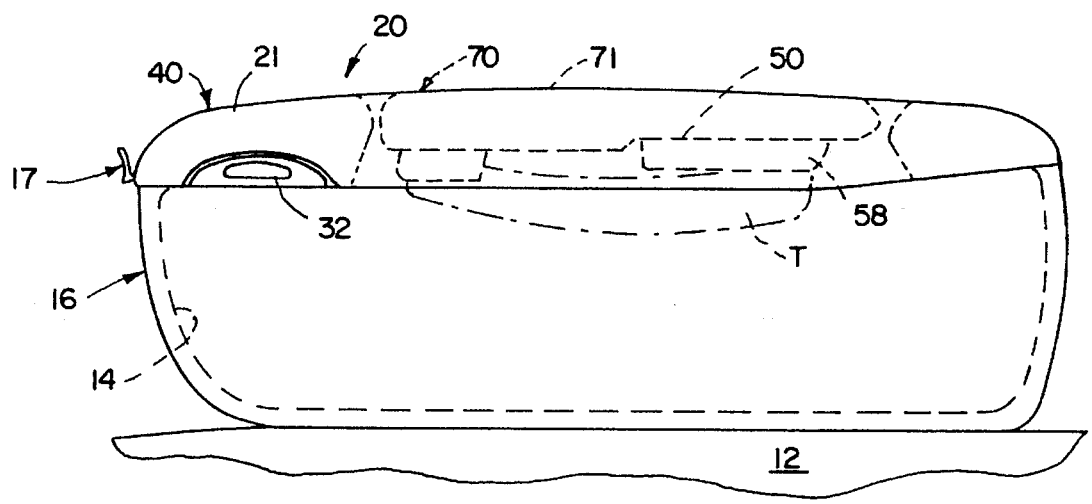
FIG. 1
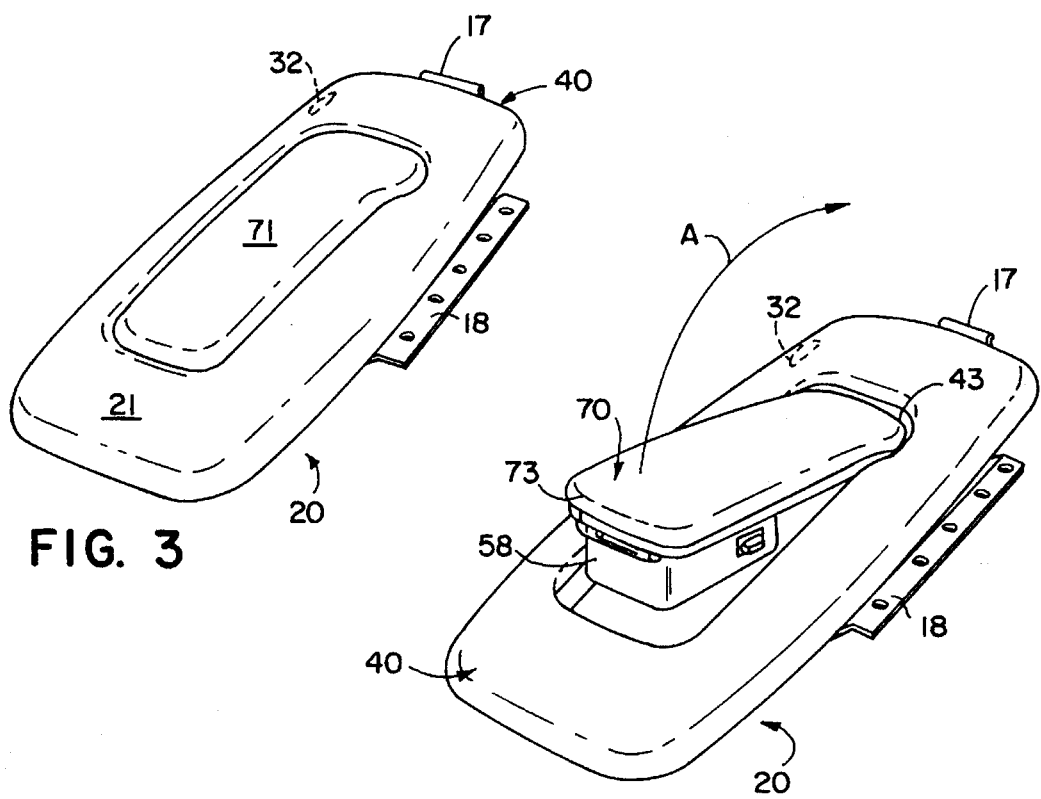
FIG. 3
FIG. 4

TELEPHONE MOUNTING SYSTEM FOR A VEHICLE

BACKGROUND OF THE INVENTION

The present invention relates to a vehicle telephone mount and particularly one for use in connection with a vehicle console or armrest.

There have been several suggested telephone mounts which position a cellular telephone in a vehicle for convenient use. One such system provides an armrest with a drawer which, when extended, moves the cellular telephone from within the drawer to a raised position conveniently locating the telephone for use by the vehicle operator or passenger. This structure is disclosed in U.S. Pat. No. 4,640,542 issued Feb. 3, 1987, to Watjer et al. and assigned to the present assignee. There have also been cellular telephone mounting systems suggested for location in other areas of a vehicle, such as in the instrument panel or in the visors. For the most part, telephone mounts used in connection with consoles or armrests have required use of the entire volume of the underlying support structure and eliminates or greatly reduces any available storage space which may otherwise be provided in the console or armrest.

SUMMARY OF THE INVENTION

The telephone mounting system of the present invention provides a cellular telephone mount comprising a carriage which is mounted within the top or cover of a vehicle storage console or armrest and which pivots from a stored position in which its decorative surface is substantially flush with the upper surface of the console or armrest to a use position in which the opposite side of the carriage is presented for use of a cellular telephone handset mounted thereto. Access for use of the telephone, therefore, is provided without opening the cover of the console or armrest and the cover can be moved independently of the telephone mount. The compact mounting of a cellular telephone in a vehicle console or armrest by the present invention, therefore, provides independent control of the telephone and storage cover without interfering with the storage volume within the console.

In a preferred embodiment of the invention, the telephone carriage includes means for releasably latching the carriage in a stored position such that upon release of the latch the telephone mount pivots to an initial partially extended position and subsequently can be pivoted to a final use position. Torque control means are provided for controlling the movement of the telephone carriage and holding the carriage in a use position for access to the telephone handset. In a preferred embodiment of the invention, the telephone mounting carriage is mounted to a cover of a console by a pivot axle which is offset to tilt the telephone carriage and telephone handset thereon to an ergonomically preferred position for access to the telephone handset by the vehicle operator.

These and other features, objects, and advantages of the present invention will become apparent upon reading the following description thereof together with reference to the accompanying drawings in which:

BRIEF DESCRIPTION OF THE DRAWINGS

FIG. 1 is a left side elevational view of a telephone mounting system embodying the present invention shown in a vehicle console;

FIG. 3 is a perspective view of the cover of the console structure shown in FIGS. 1 and 2 shown with the telephone in a stored position;

FIG. 4 is a perspective view of the cover shown in FIG. 3 shown with the telephone carriage in a first position partially extended from a storage position;

DETAILED DESCRIPTION OF THE PREFERRED EMBODIMENT

Figure 2:
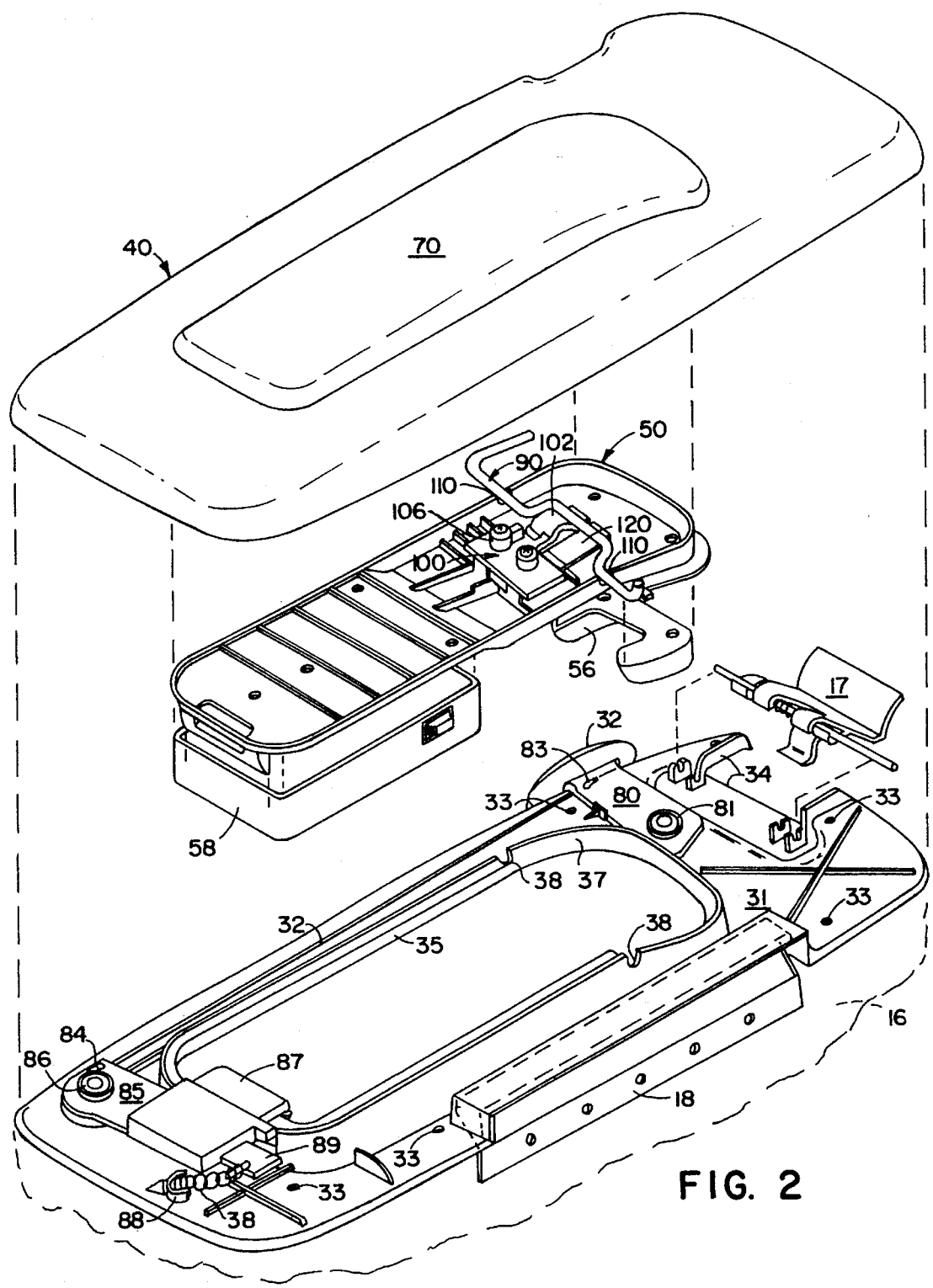
FIG. 2 is an enlarged exploded view of the components of the console cover including the telephone mounting carriage constructed according to the present invention.

Referring initially to FIG. 1, there is shown a console 10 mounted to the floor 12 of a vehicle such as an automobile. The console may be positioned between a pair of front seats or slightly forwardly and to the right of the driver's side seat. The console may also be used in the rear seat area for convenient access by the rear seat passengers. Although the invention is described in the environment of a console, it likewise could be mounted in an armrest which is mounted between seats of a vehicle. The console 10 includes, as indicated in phantom lines, a storage bin 14 which is enclosed by a cover assembly 20 pivotally mounted to the body 16 of the console which defines the storage bin 14. The cover assembly 20 provides selective access to the storage bin 14 while the upper surfaces 21 and 71 of the cover assembly provide a support surface or armrest. A hinge 18 (FIGS. 3–5) pivotally couples the cover assembly 20 to the body 16 and a latch mechanism 15 (FIG. 2), including a handle 17, releasably latches the cover assembly 20 in a closed position enclosing the storage bin 14. The cover assembly 20 includes the unique telephone mounting system of the present invention which comprises four major components as shown in the enlarged, exploded view of FIG. 2.

Figure 5:
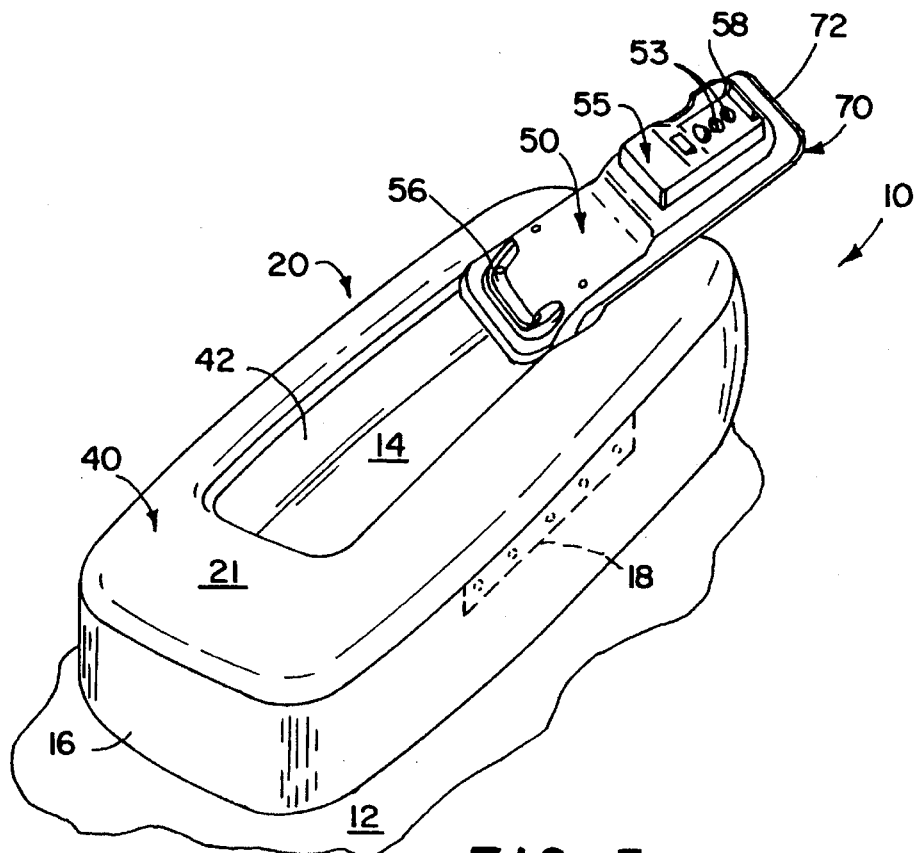
FIG. 5 is a perspective view of the console shown in FIGS. 1 and 2 shown with the telephone carriage in its fully extended use position.

The cover assembly includes a carriage latching assembly 30, a cover 40 to which the latching assembly is attached and which includes a central opening 42, and a telephone carriage 70 pivotally mounted to cover 40 and including a lower cover 50 defining a telephone handset cradle 55 and a top cover 72. As best seen in FIGS. 3–5, the cover assembly 20 provides a support surface including upper surface 21 of the rectangular outer cover 40, and the upper surface 71 of the carriage cover 72 which is substantially flush and co-planar with surface 21. These surfaces define the armrest supporting surface when the cover 40 and carriage 70 are both in a closed position illustrated in FIG. 3.

Figure 7:
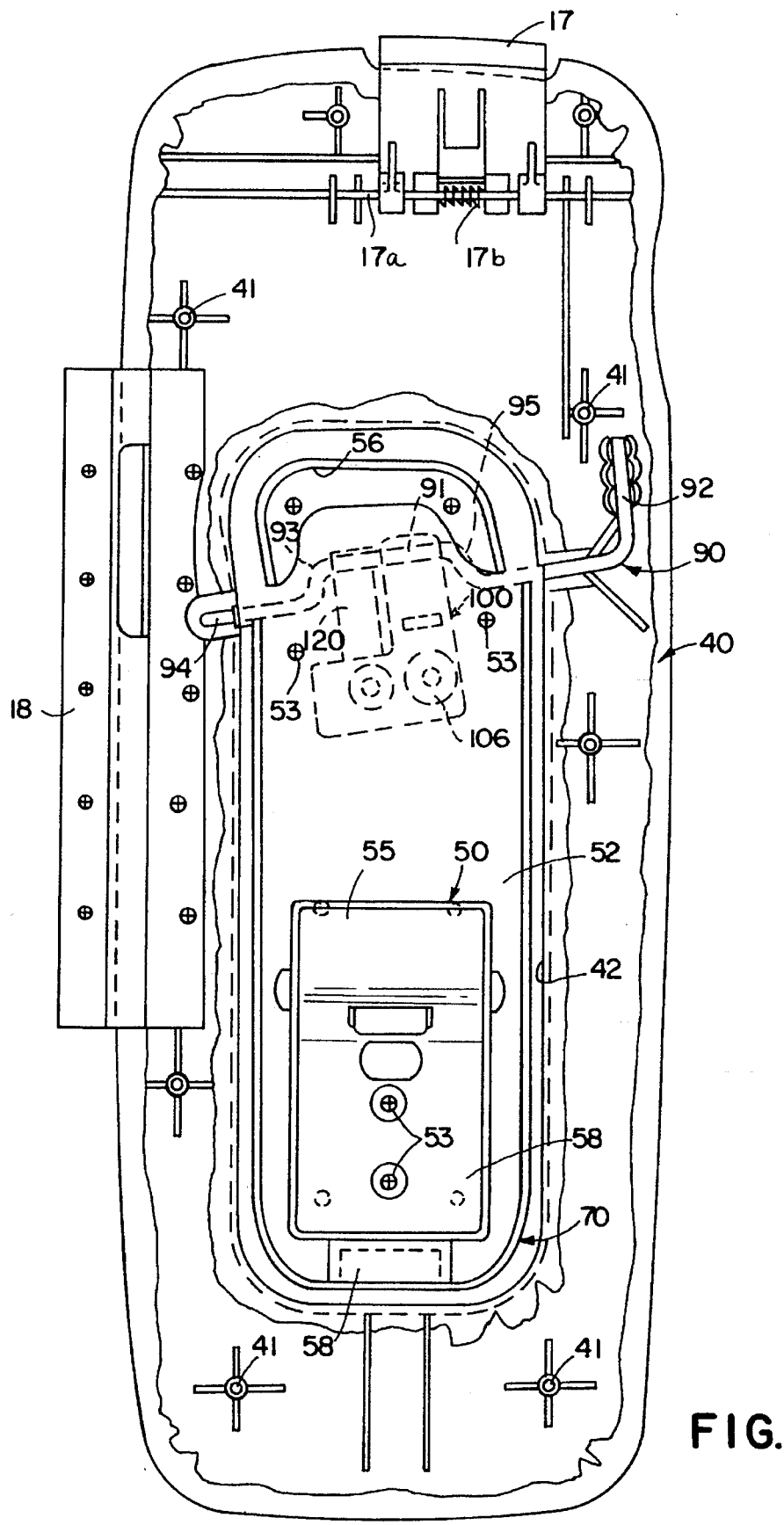
FIG. 7 is an enlarged bottom plan view of the cover shown in FIG. 3.

As seen in FIG. 4, the carriage 70 is moved from the stored position shown in FIG. 3 to a first partially extended position as described below which is effected by the actuation of a release latch button 32 associated with assembly 30. The carriage 70 and telephone handset carried thereon subsequently can be easily pivoted forwardly in an arc indicated by arrow A in FIG. 4 to a final use position illustrated in FIG. 5 in which the carriage 70 exposes a telephone cradle 55 for receiving a standard cellular telephone handset (not shown). The cradle 55 is defined by a pair of spaced mounting brackets 56 and 58 mounted to opposite ends of the lower cover 50 as seen in FIG. 5. When the carriage 70 is in its fully extended use position, the telephone cradle 55 defined thereby is slightly offset to one side for convenient positioning of the telephone handset for use by the vehicle operator. The carriage is pivotally mounted to the cover 40 offset from the longitudinal axis of the rectangular cover and for such purpose the cover includes an aperture 42 which is canted at its forward edge 43 as seen in FIGS. 3, 4 and 7. The top surface 21 of cover 40 is padded and upholstered to provide a comfortable armresting surface as is the top surface 71 of telephone carriage 70. When in the closed position, therefore, the surfaces 21 and 71 provide a substantially flush, comfortable armresting surface for the user.

Figure 6:
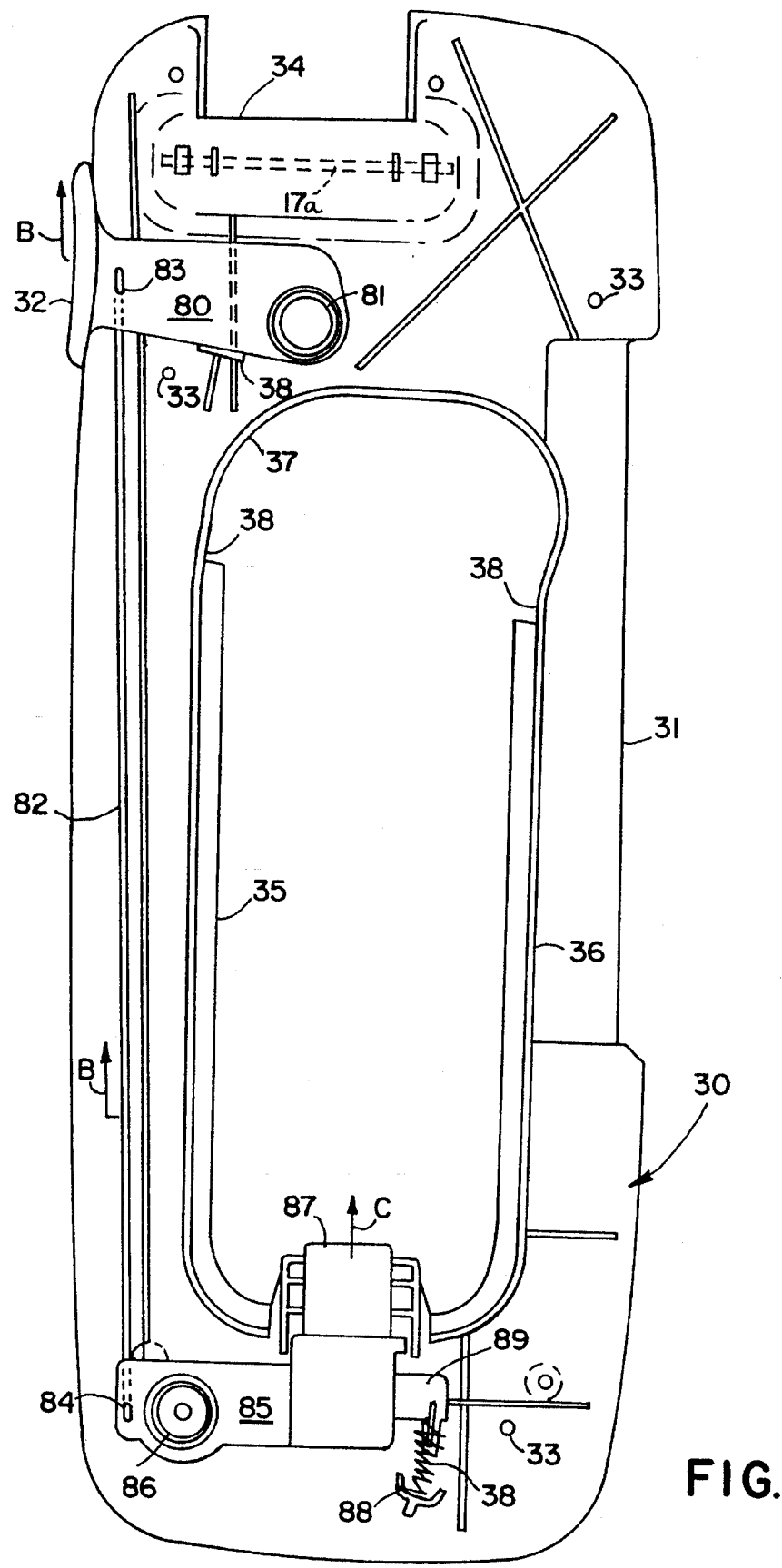
FIG. 6 is an enlarged top plan view of the carriage latching mechanism shown also in FIG. 2.

The carriage latching mechanism 30 is shown in detail in FIG. 6 and comprises a generally rectangular plate 31 which is mounted to the underside of the cover 40 by means of a plurality of fastening screws 33 which extend into mounting bosses 41 of the underside of cover 40 (FIG. 7). Plate 31 also includes a central rectangular aperture 35 having an offset forward end 37 corresponding in shape and aperture 42 of the cover 40. Aperture 35 is surrounded by a lip 36 with a pair of opposed slots 38 for receiving pivot rod 90 (FIG. 7) for the carriage 70. Plate 31 also includes a notch 34 at its forward end for receiving handle 17 of the cover latching mechanism. The latch for the telephone carriage 70 is pivotally mounted to plate 31 and includes a first arm 80 pivotally mounted by a pivot pin 81 to the forward end of plate 31, as seen in FIG. 6, and which extends laterally to the side of plate 31 and terminates in the control knob 32 which pivots in a direction indicated by arrow B to unlatch the telephone carriage as described in detail below. Coupled to pivot arm 80 is a tie rod 82 which extends through an aperture 83 in the arm 80 and which extends rearwardly and is coupled to an aperture 84 in a latch arm 85 which is pivotally mounted to plate 31 by means of a pivot pin 86. Latch arm 85 is spring biased in a forward direction indicated by arrow C and includes a latch 87 which engages a notch in the telephone cradle 55 for holding the telephone cradle in the stored position as seen in FIG. 3. Latch arm 85 is biased in a latching position by means of a compressive coil spring 39 having one end captively held in a mounting boss 88 secured to plate 31 and a second end held to a mounting arm 89 on latch arm 85. Movement of the control 32 forwardly in a direction indicated by arrow B in FIG. 6 pivots the latch arm 85 in a clockwise direction as viewed in FIG. 6 moving latch 87 rearwardly in a direction opposite arrow C for releasing the spring biased telephone carriage. The carriage is pivotally mounted to the cover 40 as now described in connection with FIGS. 7 and 8.

In FIG. 7 an underside view of cover 40 with the latching plate 31 removed but with the carriage 70 mounted thereto is shown. The carriage is shown in a closed position as seen in FIGS. 1 and 3. The outer peripheral edge of the carriage including edge 52 of cradle 55 is generally of the same shape as apertures 42 and canted section 43 formed in cover 40, but is somewhat smaller to allow a gap 53 therebetween permitting clearance and movement of the telephone carriage between its stored position shown in FIG. 3 to its use position shown in FIG. 5.

The pivot mounting of the carriage to cover 40 is achieved by a generally U-shaped steel pivot rod 90 having opposite ends 92 and 94 anchored to the undersurface 45 of cover 40 as seen in FIG. 7. The pivot rod 90 includes a base leg 91 which extends between the cover 72 of the carriage and the lower cover 50 and has a pair of legs 93 and 95 which extend rearwardly and outwardly terminating in anchored ends 92 and 94 secured to cover 40 by mounting bosses 47. Thus the pivot rod 90 is fixedly secured with respect to the cover 40 and the carriage 70 defined by cradle 55 and cover 72 pivot around the fixed rod.

Figure 8:
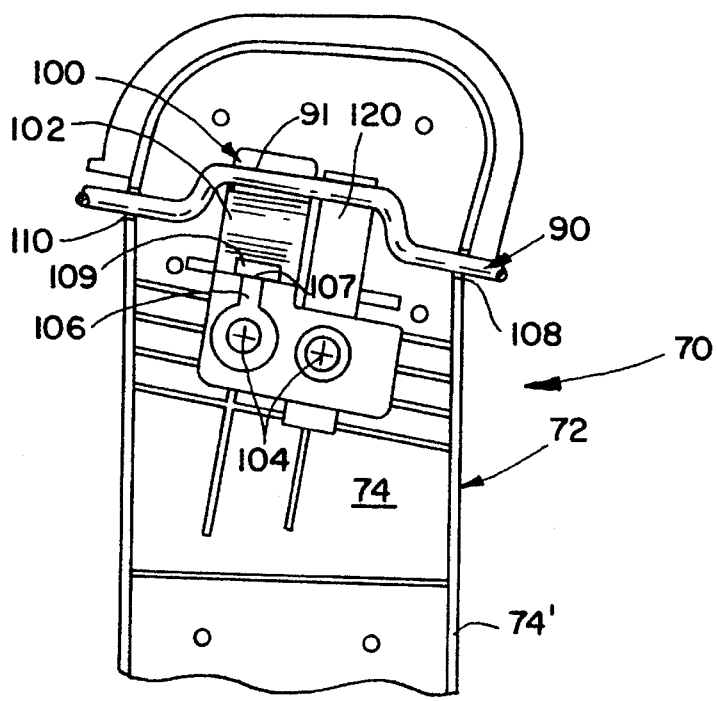
FIG. 8 is a fragmentary bottom plan view of the carriage in a stored position and shown with the cover removed showing the control mechanism for moving the carriage to an initially extended position and controlling and holding the carriage in its use position.

FIG. 8 shows in greater detail the structure extending between the carriage 70 and rod 90 and which interacts to initially urge the carriage to the position shown in FIG. 4 when the latch is actuated and subsequently control the movement of the carriage and hold it in a use position as seen in FIG. 5. In FIG. 8 the cover 50 of the carriage is removed to show a semi-cylindrical cam 100 which is secured to the inside floor 74 of cover 72 by means of a pair of fastening screws 104. Cam 100 is made of a lubricous polymeric material such as polycarbonate and includes a semi-cylindrical camming surface which continuously engages the base leg 91 of pivot rod 90 to provide a predetermined rotational control torque for the movement of the carriage. A detent member 106 has an end 107 which extends in spaced relationship to the curved camming surface 102 defining a notch 109 for releasably gripping the pivot rod 90 when the carriage is in its open position for use of the cellular telephone as seen in FIG. 5. The carriage is pivotally mounted to the rod by means of a pair of cylindrical slots 108 and 110 formed in the sides 74' of cover 72 and is held in place by the cover 50 secured to the top cover 72 by means of screws 53 (FIG. 5) for allowing the pivotal movement of the carriage 70 and cradle 55 attached thereto.

In FIG. 8 the pivot rod 90 is shown in the relative position with respect to semi-cylindrical cam 100 as it appears in the stored position of FIG. 3. In this position a leaf spring 120 which extends from under a fastener 104 forwardly and adjacent cam 100 compressibly engages the undersurface of the pivot rod 90 tending to urge the carriage from a storage position show in FIG. 3 to the first position shown in FIG. 4. Thus, leaf spring 120 is depressed downwardly in the plane of drawing FIG. 8 when the carriage is in its stored position shown in FIG. 3. When latch 87 is released by the actuation of slide button 32, however, spring 120 urges the carriage incrementally upwardly to an initially extended position as shown in FIG. 4 rotating the camming surface 102 which is in contact with the leg 91 of rod 90 along the camming surface with a predetermined torque.

For use of the telephone, the user grasps the rearward facing edge 73 of carriage 70 (FIG. 4) and continues pivoting the carriage forwardly in a direction indicated by arrow A in FIG. 4 until the detent area 109 (FIG. 8) seats over the stationary leg 91 of pivot rod 90 thus releasably holding the telephone cradle and telephone therein in a convenient use position shown in FIG. 5. By offsetting the pivot rod 90 in an angled relationship with the longitudinal axis of cover 40, the telephone cradle 50 is angled slightly away from and to the side of the cover 40 when in its use position thereby presenting the cellular telephone in a more accessible, ergonomically comfortable position for use. By providing the telephone carriage in the cover of the console or armrest, the interior storage space of the console is not compromised nor is it necessary to open the entire cover for access to the cellular telephone. By upholstering the surface 71 of the telephone carriage to match that of the cover 40, a comfortable and attractive console or armrest cover is also provided. The telephone mounting system therefore does not interfere with the normal operation of the cover or access to the storage bin, and provides a convenient mounting arrangement for a cellular telephone in a vehicle. It will become apparent to those skilled in the art that various modifications to the preferred embodiment of the invention described herein can be made without departing from the spirit or scope of the invention as defined by the appended claims.

The embodiments of the invention in which an exclusive property or privilege is claimed are defined as follows:

1. A telephone mount for a vehicle accessory such as a console, said mount comprising:

a support member including a top having a recess formed therein;

a carriage having first and second sides; and means for pivotally coupling said carriage to said top for movement of said carriage between a stored position within said recess with said first side substantially parallel to and flush with the surface of said top and a second position pivoted to an extended position from said recess substantially reversing the orientation of said carriage with respect to said support member for exposing said second side, said carriage including means on said second side for releasably holding a telephone handset.

2. The telephone mount as defined in claim 1 wherein said support member comprises one of a console or armrest.

3. The telephone mount as defined in claim 1 wherein said support member includes a storage bin and wherein said top is a cover pivotally mounted to said storage bin and further including latch means extending between said carriage and said cover for holding said carriage in said stored position for all positions of said cover.

4. A telephone mount for a vehicle accessory such as a console, said mount comprising:

a support member including a top, wherein said support member comprises one of a console or armrest;

a carriage having first and second sides;

means for pivotally coupling said carriage to said top for movement of said carriage between a stored position with said first side substantially parallel with the surface of said top and a second position pivoted to an extended position exposing said second side, said carriage including means on said second side for releasably holding a telephone handset, wherein said support member includes a storage bin and wherein said top is a cover pivotally mounted to said storage bin; and latch means extending between said carriage and said cover for holding said carriage in said stored position for all positions of said cover, and wherein said top includes a recess formed therein and wherein said carriage is positioned within said recess with said first side substantially flush with said top when in said stored position.

5. The telephone mount as defined in claim 1 wherein said means for pivotally mounting said carriage to said top includes a pivot rod fixedly mounted to one of said top and carriage and cam means mounted to the other of said top and carriage and engaging said pivot rod for controlling the pivotal movement of said carriage.

6. The telephone mount as defined in claim 5 and further including latch means extending between said top and said carriage for holding said carriage in said stored position.

7. The telephone mount as defined in claim 6 and further including bias means extending between said pivot rod and said carriage for urging said carriage to a partially extended position when said latch is released.

8. A telephone mount for a vehicle accessory such as a console, said mount comprising:

a support member including a top;

a carriage having first and second sides;

means for pivotally coupling said carriage to said top for movement of said carriage between a stored position with said first side substantially parallel with the surface of said top and a second position pivoted to an extended position exposing said second side, said carriage including means on said second side for releasably holding a telephone handset, wherein said means for pivotally mounting said carriage to said top includes a pivot rod fixedly mounted to said top and cam means mounted to said carriage and engaging said pivot rod for controlling the pivotal movement of said carriage wherein said pivot rod is generally U-shaped with a central leg engaging said cam means mounted to said carriage;

latch means extending between said top and said carriage for holding said carriage in said stored position, and bias means extending between said pivot rod and said carriage for urging said carriage to a partially extended position when said latch is released.

9. The telephone mount as defined in claim 8 and further including detent means for engaging said central leg of said pivot rod for limiting the pivotal motion of said pivot rod and for releasably holding said carriage in said use position.

10. The telephone mount as defined in claim 9 wherein said support member is one of a vehicle console and armrest.

11. The telephone mount as defined in claim to wherein said support member includes a storage bin and wherein said top defines a cover for said storage bin.

12. The telephone mount as defined in claim 11 wherein said cover includes a recess shaped to receive said carriage when in said storage position.

13. The telephone mount as defined in claim 12 wherein said pivot rod is mounted to said cover in angled relationship to move said carriage toward one side of said cover when said carriage is extended to said use position.

14. A telephone mount for a vehicle, said mount comprising:

a support member including a top having a recess formed therein;

a carriage having first and second sides, wherein said first side of said carriage has a finished surface which is exposed when said carriage is in a first position and wherein said second side of said carriage includes a telephone handset cradle; and means for coupling said carriage to said top for movement of said carriage between said first position with said first side substantially parallel to and flush with the surface of said top and a second position extended from said top in angled relationship to the longitudinal axis of said top to expose said second side.

15. The telephone mount as defined in claim 14 wherein said support member comprises one of a console or armrest.

16. The telephone mount as defined in claim 15 wherein said support member includes a storage bin and wherein said top is a cover pivotally mounted to said storage bin and further including latch means extending between said carriage and said cover for holding said carriage in said stored position for all positions of said cover.

17. The telephone mount as defined in claim 16 wherein said top includes a recess formed therein and wherein said carriage is positioned within said recess with said first side substantially flush with said top when in said stored position.

18. A telephone mount for a vehicle, said mount comprising:

a support member comprising one of a console or armrest and including a top;

a carriage having first and second sides, wherein said first side of said carriage has a finished surface which is exposed when said carriage is in a first position and wherein said second side of said carriage includes a telephone handset cradle;

means for coupling said carriage to said top for movement of said carriage between said first position with said first side substantially parallel with the surface of said top and a second position extended to expose said second side wherein said means for coupling said carriage to said top includes a pivot rod fixedly mounted to one of said top and carriage and cam means mounted to the other of said top and carriage and engaging said pivot rod for controlling the pivotal movement of said carriage, wherein said support member includes a storage bin and wherein said top is a cover pivotally mounted to said storage bin; and latch means extending between said carriage and said cover for holding said carriage in said stored position for all positions of said cover, wherein said top includes a recess formed therein and wherein said carriage is positioned within said recess with said first side substantially flush with said top when in said stored position.

19. The telephone mount as defined in claim 18 and further including bias means extending between said pivot rod and said carriage for urging said carriage to a partially extended position when said latch is released.

20. The telephone mount as defined in claim 19 wherein said pivot rod is secured to said top and is generally U-shaped with a central leg engaging said cam means mounted to said carriage.

21. The telephone mount as defined in claim 20 and further including detent means for engaging said central leg of said pivot rod for limiting the pivotal motion of said pivot rod and for releasably holding said carriage in said use position.

22. The telephone mount as defined in claim 21 wherein said support member is one of a vehicle console and armrest.

23. The telephone mount as defined in claim 22 wherein said support member includes a storage bin and wherein said top defines a cover for said storage bin.

24. The telephone mount as defined in claim 23 wherein said cover includes a recess shaped to receive said carriage when in said storage position.

25. The telephone mount as defined in claim 24 wherein said pivot rod is mounted to said cover in angled relationship to move said carriage toward one side of said cover when said carriage is extended to said use position.

* * * * *